J. GARAMI.
BABY CARRIAGE OR PERAMBULATOR.
APPLICATION FILED NOV. 21, 1918.

1,313,683.

Patented Aug. 19, 1919.
2 SHEETS—SHEET 1.

INVENTOR
Joseph Garami
BY
ATTORNEYS

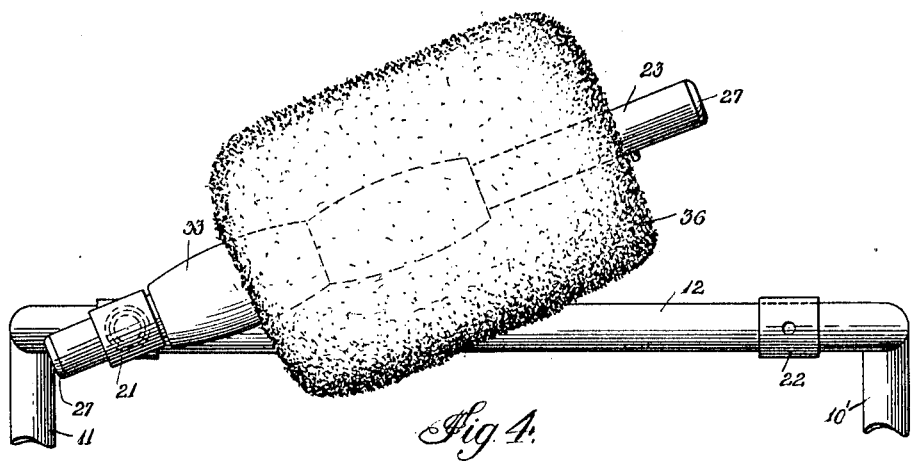
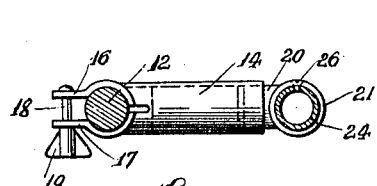
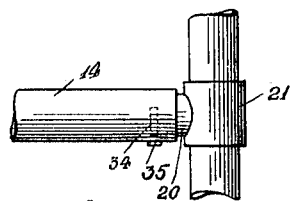
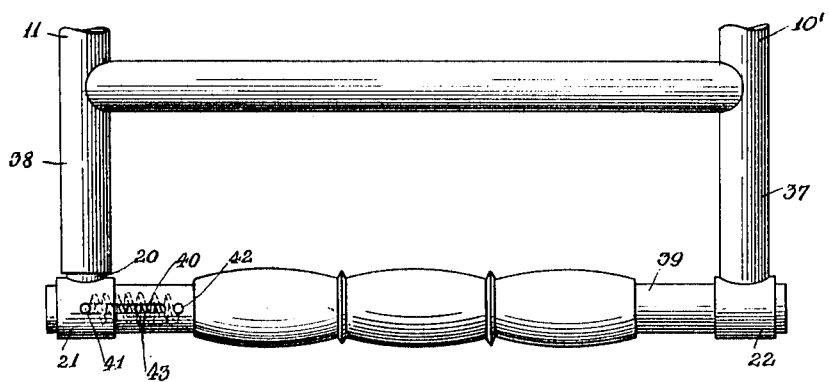

UNITED STATES PATENT OFFICE.

JOSEPH GARAMI, OF NEWARK, NEW JERSEY.

BABY-CARRIAGE OR PERAMBULATOR.

1,313,683.          Specification of Letters Patent.        Patented Aug. 19, 1919.

Application filed November 21, 1918. Serial No. 263,526.

*To all whom it may concern:*

Be it known that I, JOSEPH GARAMI, a subject of the King of Hungary, residing at Newark, in the county of Essex and State of New Jersey, have invented new and useful Improvements in Baby-Carriages or Perambulators, of which the following is a specification.

This invention relates to baby carriages, perambulators and the like, the invention being more particularly related to novel improvements in the handle-bar structures for the same.

A main object of the invention is to provide for baby carriages, perambulators or like vehicles, adapted to be propelled from behind, a handle-bar structure, wherein the bar which is grasped by the hands, is adapted to be swung about an axis so that a muff or like hand-warming device may be readily mounted thereon, the obvious purpose of thus carrying the muff or similar device being to provide convenient means by which the person, while propelling the carriage in cold or inclement weather, may keep her hands warm and comfortable.

Another object of the invention is to provide a handle-bar structure, which may be made as an attachment, capable of being secured to any ordinary type of baby carriage or perambulator having a horizontal handle-bar, or which may be made with the handle-bar structure itself as a permanent feature thereof.

With the foregoing objects in view and others, the invention resides in the details of construction and in the arrangement and combination of parts hereinafter described, defined in the claims, and illustrated in the accompanying drawings, forming a material part of this specification; and it will be understood that changes and alterations in the precise embodiment of the invention, as herein disclosed, may be made, to which changes and alterations the inventor is entitled, provided the same are effected within the scope of what is claimed.

In the accompanying drawings:—Figure 1 is a view in side elevation, showing a baby carriage equipped with my invention.

Fig. 4 is a view in rear elevation, showing the horizontal handle-bar inclined upwardly about its axis, this view showing also a muff mounted on the handle-bar and arranged almost in service position around the handle-bar thereof.

Fig. 5 is a sectional view, taken on the line 5—5 of Fig. 2.

Fig. 6 is a fragmental detail view, illustrating in particular the pin and slot arrangement, which permits the swinging of the horizontal handle-bar, as about an axis.

Fig. 7 is a top plan view, showing how the improvements may be incorporated in the handle-bar structure as a permanent feature thereof.

Referring more particularly to the accompanying drawings, the numeral 10 denotes a baby carriage, equipped with the usual handle-bar structure including the side rails 10' and 11 and the horizontal handle-bar 12.

Figure 1:
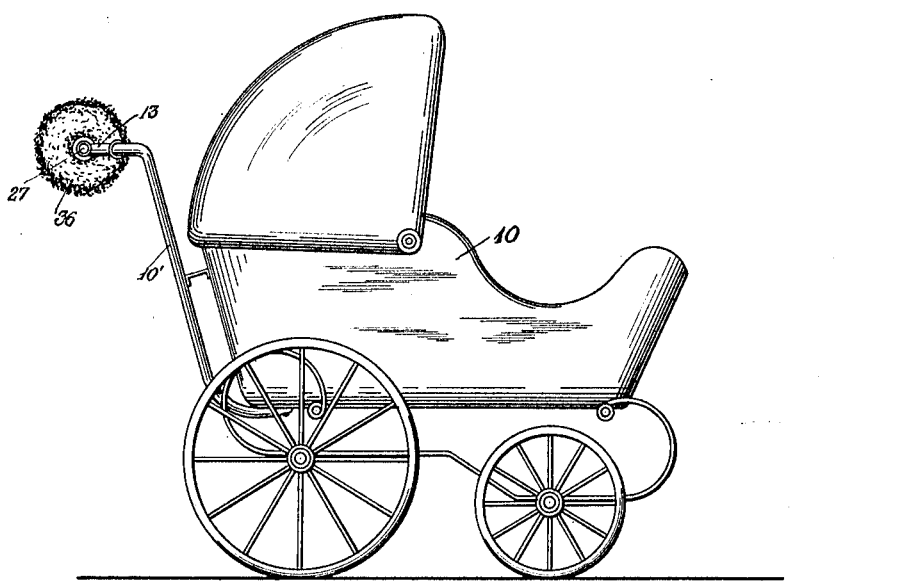
Figure 2:
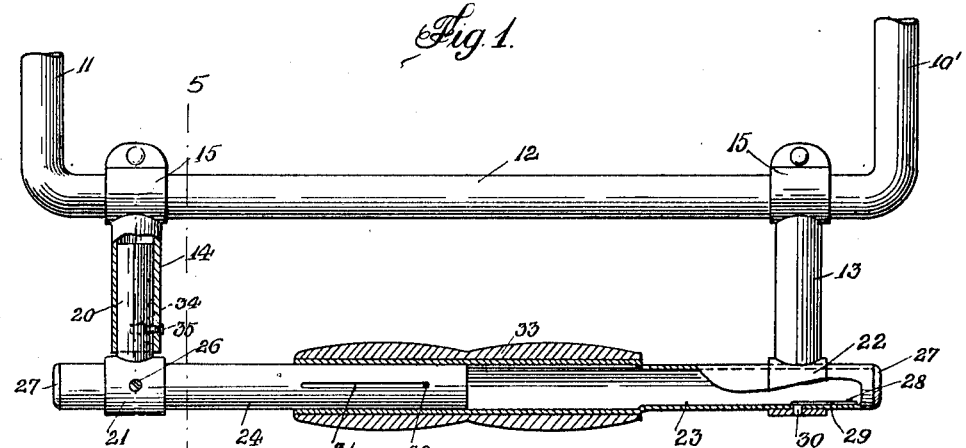
Fig. 2 is a top plan view, showing the invention applied as an attachment, parts being broken away and parts being shown in section.
Figure 3:
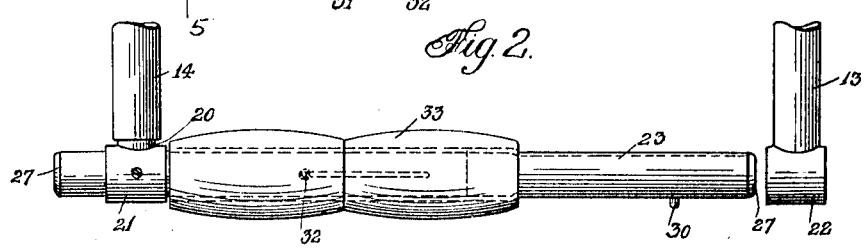
Fig. 3 is a fragmental top plan view, showing the horizontal handle-bar disengaged at one end.

As best illustrated in Fig. 2, my improvements embody two tubular supporting shafts 13 and 14, to each of which at its forward end is brazed or otherwise secured a split clamping ring 15 having integral projecting ears 16 and 17. The clamping rings are made of spring material, so that by drawing upon the ears 16 and 17 in opposite directions, they can readily be spread and mounted upon a horizontal bar as 12. The ears 16 and 17 are apertured to receive pins 18, which are screw-threaded at their free ends for the application of wing-nuts 19, by means of which the rings may be securely clamped in the spaced apart positions desired upon the horizontal bar.

One of the tubular supporting shafts, herein shown as shaft 14, is somewhat shorter in length than the other one, and within the same is movably fitted a tubular shaft 20, the outer end of which is formed with a transversely extending tubular holding head 21. The tubular supporting shaft 13 has also provided at its rear end a similar holding head 22. Extending through and supported by said holding heads 21 and 22 is the handle-bar proper consisting of the telescopic shaft members 23 and 24, of which the member 24 is fixedly secured to the holding head 21 by a screw 26 or equivalent means. Both members 23 and 24 are formed with an outer closed end 27. As a means of locking and unlocking the member 23 with its holding head 22, I pin at 28 within and to the member 23 the end of a spring plate 29, carrying a button 30, which projects outwardly through appropriate registering openings provided both in said member 23 and in said holding head 22. To slide the member 23 upon its coöperating member 24 so as to disengage the former from its holding head 22, it is but necessary to push inwardly upon the button 30 until the same clears the holding head 22 in an obvious manner. To prevent disengagement of the members 23 and 24, the latter is provided with a longitudinal slot 31, into which projects a screw pin 32 which is threaded in proper position through a hand-grip 33, carried by the member 23, as well as through said member 23 itself. So that the coöperating members 23 and 24 may be swung as an entity upon an axis, the supporting shaft 20 is provided circumferentially with a slot 34, into which projects a screw pin 35, which is threaded in proper position through the outer shaft 14.

By unlocking and disengaging the member 23 from its holding head 22, and swinging it upwardly (or downwardly), as illustrated in Fig. 4, a muff 36 or other similar hand-warming structure may be readily mounted upon the member 23, and moved into position to encompass the hand-grip 33, it being observed that the parts are so arranged that the hand-grip 33 occupies a central position between the supporting tubes 13 and 14 when the member 23 is secured in position in its holding head 22.

In Fig. 7, I illustrate how my improved muff support, instead of being made as an attachment, is incorporated in the handle-bar structure itself, the side rails 10' and 11 being continued rearwardly to provide extensions 37 and 38, formed and equipped to serve as substitutes for the supporting shafts 13 and 14. Thus the extension 37 may be provided with the holding head 22, while the extension 38 may be made hollow to receive as before the supporting shaft 20 having a holding head 21. In the form previously described, a two-part telescopic handle-bar is provided to allow for adjustment lengthwise, so that the attachment can be fitted to carriages differing in size or type. In this form such adjustment is unnecessary, and accordingly I provide a one-piece handle-bar 39, supported in and between the holding heads 21 and 22. To provide for its disengagement from the holding head 22 so that it may be swung upon the shaft 20 as an axis, the handle-bar 39 is made with a longitudinal slot 40, through which projects a pin 41, which is threaded into the holding head 21. Arranged within the handle bar behind the slot 40 and connected between said pin 41 and another pin 42, rigid with the handle-bar, is a push spring 43, which normally maintains the handle-bar projecting through the holding head 22, but which permits the same to be given longitudinal movement so as to be disengaged from said holding head to allow the application of a muff 36, as before.

Having thus described my invention, what I claim is:—

1. In a baby carriage or like conveyance, a handle-bar structure including a fixed element and a rotatable element each provided with a transversely extending holding head, and a handle-bar adapted to span the distance between the holding heads, connected at one end with the holding head of the rotatable element so as to swing with the same as upon an axis, said handle-bar at its opposite end being engageable in the holding head of the fixed element, as and for the purpose specified.

2. An attachment for a baby carriage or like conveyance, including a pair of supporting elements adapted each to be clamped upon a fixed part of the carriage structure, one of said supporting elements including a rotatable part, the said second supporting element and said rotatable part each being provided with a holding head, an adjustable handle-bar connected at one end with the holding head of said rotatable part and movable therewith as upon an axis, and means for locking the opposite end of said handle-bar with the holding head of said second supporting element, as and for the purpose specified.

3. An attachment for a baby carriage or like conveyance, including a pair of tubular supporting elements, means combined with each tubular element for clamping it to the handle-bar of the carriage structure, an element rotatably connected with one of the supporting elements, said rotatable element and the other tubular supporting element each being formed with a holding head, a longitudinally adjustable handle-bar attached at one end to the holding head of said rotatable element and movable therewith as upon an axis, and means for locking the opposite end of said handle-bar with the holding head of the other tubular supporting element, as and for the purpose specified.

4. A handle-bar structure for a baby carriage or like conveyance, including a pair of side rails one of which is formed with a transversely extending holding head and the other of which is provided with an opening therein, a supporting element rotatably fitted in said opening and provided with a holding head, a handle-bar adapted to span the distance between the holding head of said rotatable element and the holding head of said side rail, said handle-bar being connected at one end with said rotatable element so as to be swung therewith as upon an axis, its connection therewith being such as to allow longitudinal movement sufficient to provide for the engagement and disengagement of its opposite end with the holding head of said side bar, and yielding means normally urging said handle-bar in proper engagement with the holding head of said side bar, as and for the purpose specified.

In testimony whereof I have signed my name to this specification.

JOSEPH GARAMI.